(12) United States Patent
Tomita et al.

(10) Patent No.: US 12,464,611 B2
(45) Date of Patent: Nov. 4, 2025

(54) HEATING DEVICE

(71) Applicants: TOYOTA JIDOSHA KABUSHIKI KAISHA, Toyota (JP); K.K. SUN METALON, Yokohama (JP)

(72) Inventors: Takashi Tomita, Toyota (JP); Yuichi Furukawa, Toyota (JP); Kazuhiko Nishioka, Yokohama (JP); Takashi Yasu, Yokohama (JP); Yuki Maeda, Yokohama (JP); Daichi Suzuki, Yokohama (JP)

(73) Assignees: TOYOTA JIDOSHA KABUSHIKI KAISHA, Toyota (JP); K.K. SUN METALON, Kanagawa (JP)

( * ) Notice: Subject to any disclaimer, the term of this patent is extended or adjusted under 35 U.S.C. 154(b) by 0 days.

(21) Appl. No.: 19/074,130

(22) Filed: Mar. 7, 2025

(65) Prior Publication Data
US 2025/0287481 A1 Sep. 11, 2025

(30) Foreign Application Priority Data

Mar. 8, 2024 (JP) .................................. 2024-035502

(51) Int. Cl.
*H05B 6/80* (2006.01)
*H05B 6/64* (2006.01)

(52) U.S. Cl.
CPC ........... *H05B 6/802* (2013.01); *H05B 6/6402* (2013.01); *H05B 6/6411* (2013.01); *H05B 2214/03* (2013.01)

(58) Field of Classification Search
CPC ..... H05B 6/802; H05B 6/6402; H05B 6/6411
(Continued)

(56) References Cited

U.S. PATENT DOCUMENTS 4,381,934 A 5/1983 Kunkle et al.
10,131,845 B2 * 11/2018 Qiu ........................ C10B 19/00
(Continued)

FOREIGN PATENT DOCUMENTS

CN 109054899 A * 12/2018
JP S52-110717 A 9/1977
(Continued)

OTHER PUBLICATIONS

Translation of CN109054899A, "Pulverized Coal Gasification Device and Gasification method", Dec. 21, 2018, By WIPO (Year: 2018).*

*Primary Examiner* — Quang T Van
(74) *Attorney, Agent, or Firm* — Knobbe Martens Olson & Bear LLP

(57) ABSTRACT

There is provided a heating device that is capable of increasing heating efficiency of a heating target by microwave irradiation. The heating device includes a microwave irradiator configured to irradiate a heating target with microwaves, and a collector configured to collect fluid generated from the heating target that is irradiated with the microwaves. The microwaves are electromagnetic waves with a frequency of 300 MHz to 30 GHz, for example. The heating target includes metal, for example. Furthermore, the heating target includes non-metal such as oil, organic compound, and water, for example. When the heating target is irradiated with the microwaves, the heating target is heated, and non-metal with lower melting point and boiling point than metal becomes fluid and is separated from the heating target.

10 Claims, 12 Drawing Sheets

(58) Field of Classification Search
USPC ........ 219/686, 687; 422/102, 103, 112, 113, 422/119, 186, 242, 78, 99
See application file for complete search history.

(56) References Cited

U.S. PATENT DOCUMENTS

| | | |
|---|---|---|
| 2009/0039572 A1 | 2/2009 | Nagata et al. |
| 2024/0165700 A1 | 5/2024 | Nishioka et al. |
| 2024/0165706 A1 | 5/2024 | Nishioka et al. |
| 2024/0165707 A1 | 5/2024 | Nishioka et al. |
| 2024/0189902 A1 | 6/2024 | Nishioka et al. |
| 2025/0018473 A1 | 1/2025 | Nishioka et al. |

FOREIGN PATENT DOCUMENTS

| | | |
|---|---|---|
| JP | S57-051133 A | 3/1982 |
| JP | S58-020735 A | 2/1983 |
| JP | S61-117191 A | 6/1986 |
| JP | H05-031500 A | 2/1993 |
| JP | 2006-035148 A | 2/2006 |
| JP | 2009-035776 A | 2/2009 |
| JP | 2012-096168 A | 5/2012 |
| JP | 2012-158790 A | 8/2012 |
| JP | 2013-216943 A | 10/2013 |
| JP | 2014-067575 A | 4/2014 |
| JP | 2015-031403 A | 2/2015 |
| JP | 2017-145151 A | 8/2017 |
| JP | 2020-192511 A | 12/2020 |
| WO | WO 2022/195989 A1 | 9/2022 |
| WO | WO 2022/196681 A1 | 9/2022 |

\* cited by examiner

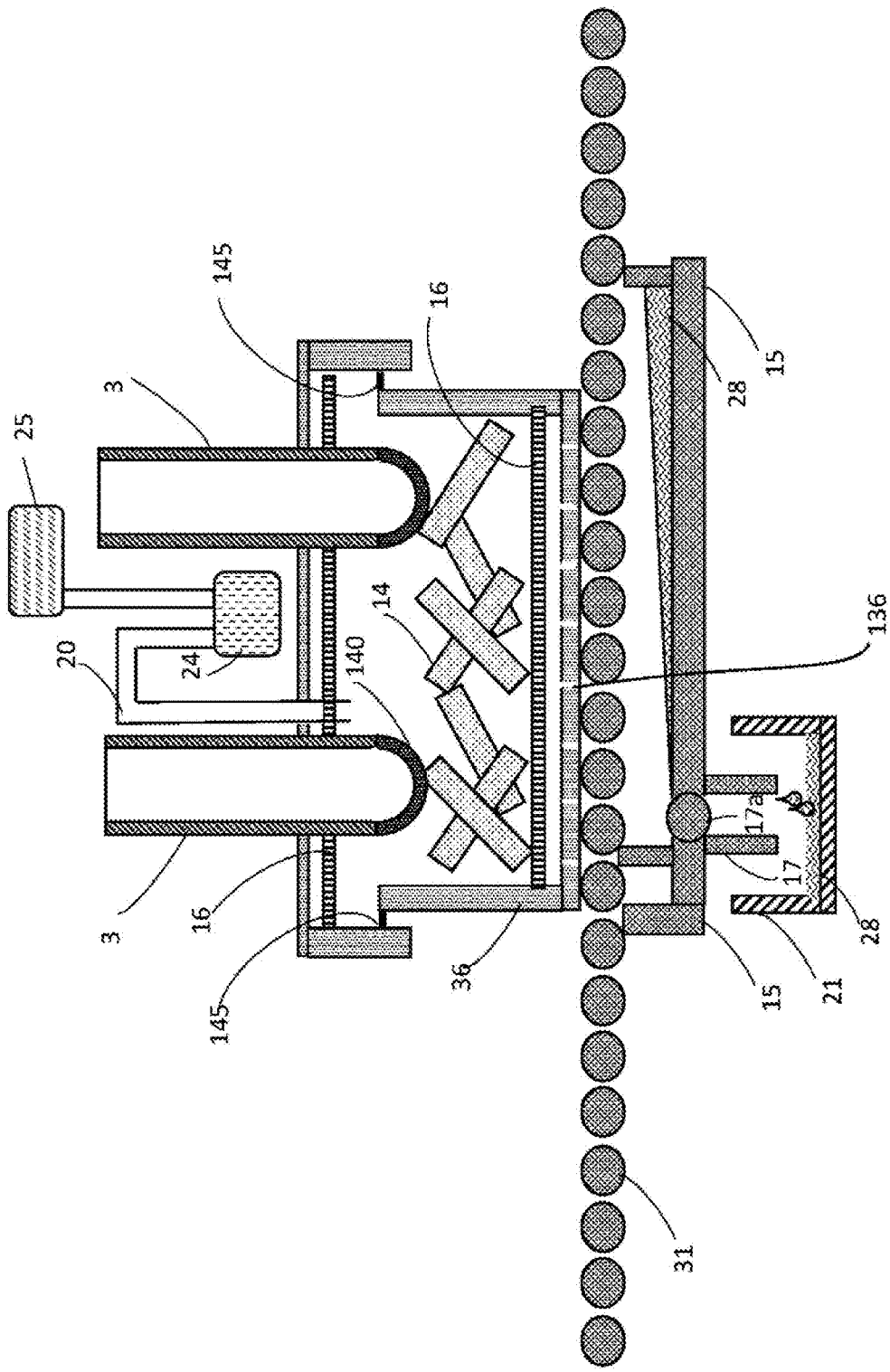

HEATING DEVICE

BACKGROUND

Field

Some aspects of the present disclosure relate to a heating device.

Description of the Related Art

When heating a heating target, there are cases that the heating target is irradiated with microwaves.

CITATION LIST

Patent Literature

[Patent Literature 1] Japanese Patent Laid-Open No. 2012-158790
[Patent Literature 2] Japanese Patent Laid-Open No. 2017-145151
[Patent Literature 3] Japanese Patent Laid-Open No. 2009-035776
[Patent Literature 4] Japanese Patent Laid-Open No. 2013-216943
[Patent Literature 5] Japanese Patent Laid-Open No. 2017-145151
[Patent Literature 6] International Publication No. WO 2022/195989
[Patent Literature 7] International Publication No. WO 2022/196681

An object of some aspects of the present disclosure is to provide a heating device that is capable of increasing heating efficiency of a heating target by microwave irradiation.

SUMMARY

A heating device according to an embodiment includes a microwave irradiator configured to irradiate a heating target with microwaves, and a collector configured to collect fluid generated from the heating target that is irradiated with the microwaves.

In relation to the heating device described above, the heating target may be metal.

In relation to the heating device described above, the fluid may be liquid, and the collector may include a liquid collector configured to collect the liquid.

In relation to the heating device described above, the liquid collector may be disposed on a lower side than the heating target in a direction of gravity.

In relation to the heating device described above, the liquid collector may include a drain pan configured to receive the liquid.

In relation to the heating device described above, the liquid collector may further include a drain pipe that is connected to the drain pan and through which the liquid flows.

In relation to the heating device described above, the liquid collector may further include a tank that is connected to the drain pipe and that stores the liquid.

In relation to the heating device described above, the fluid may be gas, and the collector may include a gas collector configured to collect the gas.

In relation to the heating device described above, the gas collector may include a gas collection pipe that is connected to an irradiation chamber where the heating target to be irradiated with the microwaves is disposed.

In relation to the heating device described above, the gas collector may include a liquefier configured to liquefy the gas that is collected. The liquefier may cool and liquefy the gas that is collected.

The heating device described above may further include a holding member configured to hold the heating target, the holding member including an opening for allowing the fluid to pass through to the collector.

In relation to the heating device described above, the holding member may be rotatable.

In relation to the heating device described above, the holding member may move parallelly.

In relation to the heating device described above, the holding member may be a stage, and the heating target may be disposed on the stage.

In relation to the heating device described above, the holding member may have a hollow shape, and the heating target may be disposed inside the holding member.

In relation to the heating device described above, the holding member having a hollow shape may be rotatable.

The heating device described above may further include a transporter configured to transport the heating target relative to the microwave irradiator.

In relation to the heating device described above, the transporter may include a pusher configured to push the heating target.

In relation to the heating device described above, the transporter may include a roller conveyor.

The heating device described above may further include an irradiation chamber where the heating target to be irradiated with the microwaves is disposed, and a pre-heating chamber connected to the irradiation chamber, and the heating target before irradiation with the microwaves may be disposed in the pre-heating chamber.

The heating device described above may further include a gaseous environment conditioner configured to equalize a gaseous environment inside the irradiation chamber and a gaseous environment inside the pre-heating chamber.

The heating device described above may further include an irradiation chamber where the heating target to be irradiated with the microwaves is disposed, and a post-heating chamber connected to the irradiation chamber, and the heating target after irradiation with the microwaves may be disposed in the post-heating chamber.

The heating device described above may further include a gaseous environment conditioner configured to equalize a gaseous environment inside the irradiation chamber and a gaseous environment inside the post-heating chamber.

The heating device described above may further include a supplier configured to supply the heating target before irradiation with the microwaves to a microwave irradiation region.

In relation to the heating device described above, the fluid may be at least one of oil and water.

Advantageous Effect

According to the present disclosure, it is possible to provide a heating device that is capable of increasing heating efficiency of a heating target by microwave irradiation.

BRIEF DESCRIPTION OF THE DRAWINGS

FIG. 12 is a schematic diagram of the heating device according to the embodiment.

DETAILED DESCRIPTION

In the following, embodiments of the present invention will be described with reference to the drawings. It should be noted that the drawings are schematic. Accordingly, specific dimensions and the like should be determined in view of the description below. Furthermore, the dimensional relationship and proportion may differ among the drawings.

Figure 1:
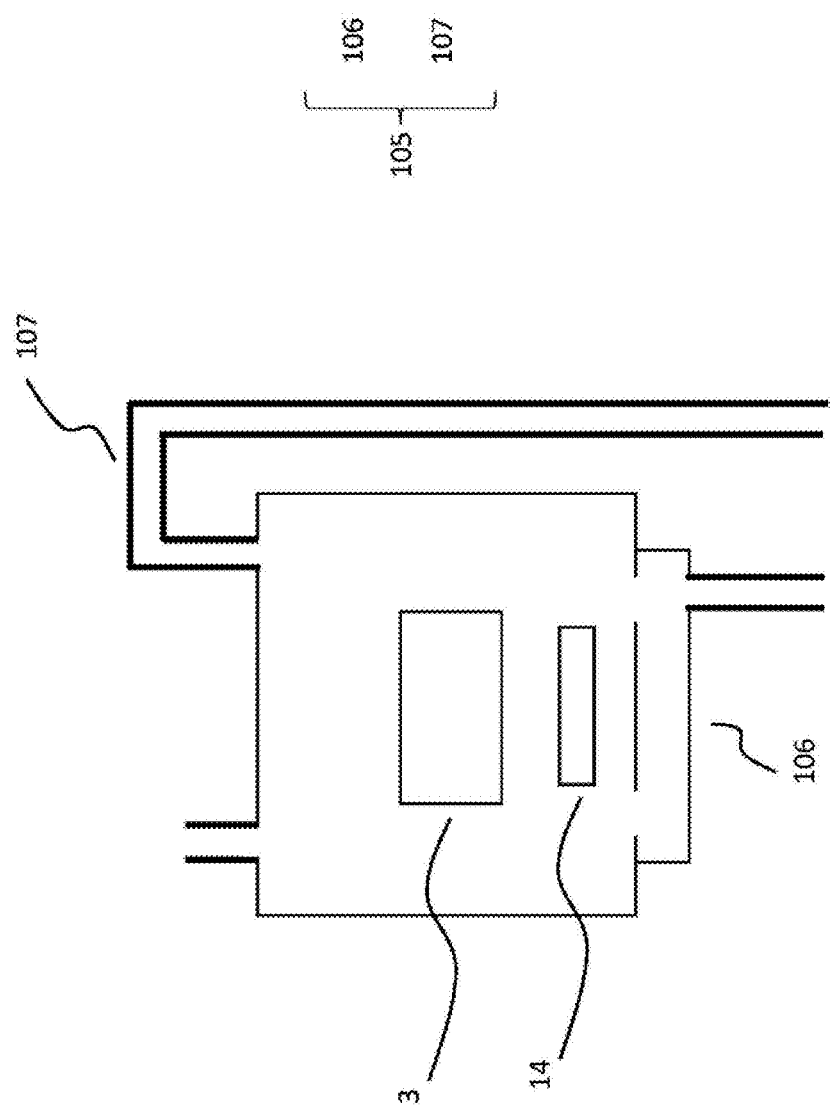
FIG. 1 is a schematic diagram of a heating device according to an embodiment.

As shown in FIG. 1, a heating device according to the embodiment includes a microwave irradiator 3 configured to irradiate a heating target 14 with microwaves, and a collector 105 configured to collect fluid generated from the heating target 14 that is irradiated with microwaves. Microwaves are electromagnetic waves with a frequency of 300 MHz to 30 GHz, for example.

The heating target 14 includes metal, for example. The heating target 14 includes ceramic, for example. Furthermore, the heating target 14 includes non-metal such as oil, organic compound, and water, for example. In the present disclosure, oil includes emulsion. When the heating target 14 is irradiated with microwaves, the heating target 14 is heated, and non-metal with lower melting point and boiling point than metal and ceramic becomes fluid and is separated from the heating target. The heating target 14 may be reduced due to being irradiated with microwaves. The heating target 14 may be sintered or melted and solidified due to being irradiated with microwaves.

Fluid that is generated from the heating target 14 includes liquid and gas. The collector 105 may include a liquid collector 106 configured to collect the liquid. Examples of the liquid include water, oil, and organic compound. The collector 105 may include a gas collector 107 configured to collect the gas. Examples of the gas include vaporized water, vaporized oil, and vaporized organic compound.

Oil may be water soluble or insoluble. Oil may include at least one of surfactant, rust preventive, and preservative. Oil may be mixed with water to form emulsion. Examples of oil include cutting oil and release agent. Examples of cutting oil include mineral oil, animal and plant oil and fat, and synthetic oil, and a mixture thereof.

Furthermore, oil may be rolling oil, extrusion oil used for extrusion processing, drawing oil used for drawing processing, pressing oil used for pressing processing, forging oil used for forging processing, hydraulic oil leaking from a processing machine at the time of metal processing or cutting, or oil, such as cooling oil, rust preventive oil or lubricating oil, attached to the heating target 14 from a machine processing the heating target 14.

Examples of organic compound include surfactant and silicone oil.

Figure 2:
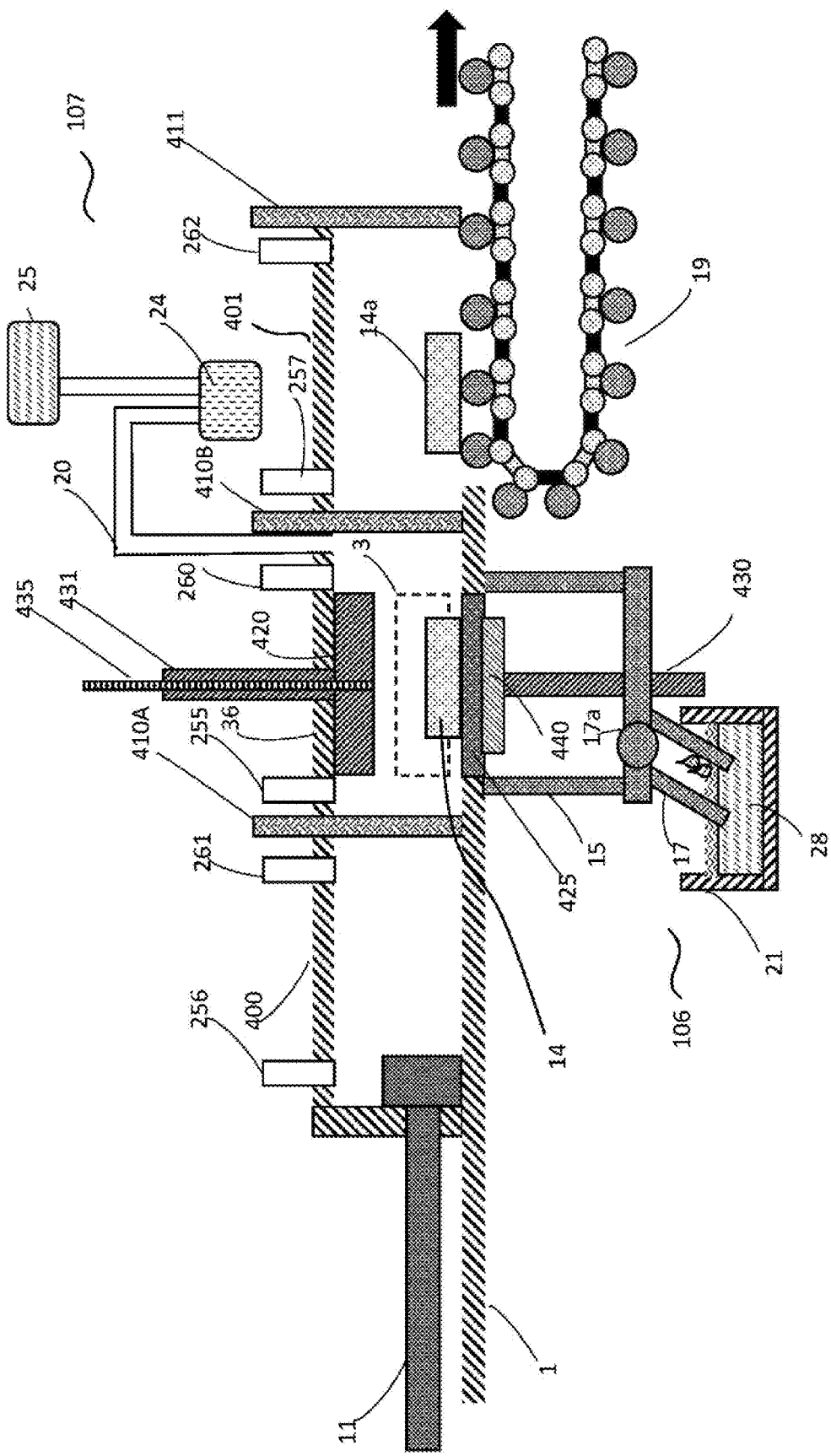
FIG. 2 is a schematic diagram of the heating device according to the embodiment.

As shown in FIG. 2, the liquid collector 106 is disposed on a lower side in a direction of gravity than the heating target 14 at a time of microwave irradiation. The liquid collector 106 may include a drain pan 15 for receiving liquid separated from the heating target 14, a drain pipe 17 that is connected to the drain pan 15 and through which liquid flows, and a tank 21 that is connected to the drain pipe 17 and that stores liquid 28. A valve 17a may be provided between the drain pan 15 and the drain pipe 17. The valve 17a prevents outside air from entering an irradiation chamber 36 described later.

The heating device according to the embodiment may further include a holding member 425 for holding the heating target 14 at a time of microwave irradiation. The holding member 425 is a stage, for example, and the heating target 14 is disposed on the stage. An opening is formed in the holding member 425, the opening being for allowing liquid, for example, separated from the heating target 14 that is irradiated with microwaves and heated to pass through to the liquid collector 106. There may be one or more openings.

Liquid that is separated from the heating target 14 that is irradiated with microwaves and heated falls into the drain pan 15 through the opening in the holding member 425. The liquid accumulated in the drain pan 15 is transferred to the tank 21 through the drain pipe 17.

The heating device according to the embodiment may further include the irradiation chamber 36 inside which the heating target 14 to be irradiated with microwaves is to be disposed. The microwave irradiator 3 irradiates the heating target 14 that is disposed inside the irradiation chamber 36 with microwaves. For example, it is possible to seal inside of the irradiation chamber 36 from outside at a time of radiation of microwaves by the microwave irradiator 3. A bottom portion of the irradiation chamber 36 may form the drain pan 15.

For example, the irradiation chamber 36 is provided with a carry-in door 410A for allowing the heating target 14 to enter the irradiation chamber 36, and a carry-out door 410B for allowing the heating target 14 to leave the irradiation chamber 36.

The gas collector 107 may include a gas collection pipe 20 connected to the irradiation chamber 36, a suction pump 24 for suctioning gas inside the irradiation chamber 36 into the gas collection pipe 20, and a liquefier 25 for liquefying collected gas. Gas separated from the heating target 14 that is irradiated with microwaves and heated is collected from the irradiation chamber 36 by the suction pump 24 through the gas collection pipe 20 and is transferred to the liquefier 25. The liquefier 25 cools the collected gas to liquefy the gas, for example.

The heating target 14 may include a simple metal or a metal compound such as an alloy. Examples of metal include iron (Fe), nickel (Ni), copper (Cu), gold (Au), silver (Ag), aluminum (Al), cobalt (Co), tungsten (W), titanium (Ti), chromium (Cr), molybdenum (Mo), beryllium (Be), magnesium (Mg), tin (Sn), cerium (Ce), lead (Pb), mercury (Hg), sodium (Na), bismuth (Bi), and gallium (Ga).

The sintering temperature of iron (Fe) is 1200° C., for example. The melting point of iron (Fe) is 1538° C. The sintering temperature of nickel (Ni) is 1200° C., for example. The melting point of nickel (Ni) is 1495° C. The sintering temperature of copper (Cu) is 800° C., for example. The melting point of copper (Cu) is 1085° C. The sintering temperature of gold (Au) is 800° C., for example. The melting point of gold (Au) is 1064° C. The sintering temperature of silver (Ag) is 750° C., for example. The melting point of silver (Ag) is 962° C. The sintering temperature of aluminum (Al) is 500° C., for example. The melting point of aluminum (Al) is 660° C. The sintering temperature of cobalt (Co) is 1100° C., for example. The melting point of cobalt (Co) is 1455° C.

The heating target 14 may include one species of metal, or a plurality of species of metal. Examples of metal compound include, but are not limited to, an alloy composed of a plurality of metal elements, an alloy composed of a metal element and a non-metal element, an oxide of metal, a hydroxide of metal, a chloride of metal, a carbide of metal, a boride of metal, and a sulfide of metal. Metal raw material may include, as alloy components, silicon (Si), manganese (Mn), chromium (Cr), nickel (Ni), carbon (C), boron (B), copper (Cu), aluminum (Al), titanium (Ti), niobium (Nb), vanadium (V), zinc (Zn), antimony (Sb), palladium (Pd), lanthanum (La), gold (Au), potassium (K), cadmium (Cd), indium (In), molybdenum (Mo), sulfur(S), and the like.

The heating target 14 is not particularly limited in terms of shape and size. The heating target 14 may be solid or powder. The heating target 14 may be plate-shaped or sheet-shaped. The heating target 14 may include a green compact of metal powder. The heating target 14 may include a metal fragment. The heating target 14 may be a briquette.

In the case where the heating target 14 is a molded body formed from a metal material, pressure of 1 MPa or more, 100 MPa or more or 200 MPa or more, and 2000 MPa or less, 1900 MPa or less or 1800 MPa or less, for example, may be applied to metal raw material at the time of molding the metal raw material into the molded body. By applying the pressure, a metallic solid that is made by heating the heating target 14 and sintering or melting and solidifying the metal tends to be dense. As a pressurization method, uniaxial molding, cold isostatic pressing (CIP) molding, hot isostatic pressing (HIP) molding, and roller pressurization can be raised.

The holding member 425 may include a heating promoter for promoting heating of the heating target 14 that is irradiated with microwaves.

The heating promoter may include an absorbent material that absorbs microwaves in a temperature zone at least a part of which is lower than a temperature zone in which metal raw material of the heating target 14 absorbs microwaves. The absorbent material has a higher melting point than the metal raw material. At least a part of the temperature zone in which the absorbent material absorbs microwaves is lower than the temperature zone in which the metal raw material absorbs microwaves. The temperature zone in which the metal raw material absorbs microwaves is 300° C. or more and 1200° C. or less, 450° C. or more and 1100° C. or less, or 600° C. or more and 800° C. or less, for example. The temperature zone in which the absorbent material absorbs microwaves is 25° C. or more and 1000° C. or less, 50° C. or more and 1000° C. or less, 75° C. or more and 1000° C. or less, 100° C. or more and 1000° C. or less, 250° C. or more and 900° C. or less, or 400° C. or more and 600° C. or less, for example.

At least a part of the temperature zone in which the absorbent material absorbs microwaves preferably overlaps the temperature zone in which the metal raw material absorbs microwaves. The absorbent material generates heat earlier than the metal raw material because the absorbent material absorbs microwaves in the temperature zone at least a part of which is lower than the temperature zone in which the metal raw material absorbs microwaves. Accordingly, the absorbent material can heat the metal raw material before the temperature zone in which the metal raw material absorbs microwaves is reached.

Accordingly, when the heating promoter includes the absorbent material, the temperature of the metal raw material fast reaches the temperature zone in which microwaves are absorbed, and a heating time of the metal raw material can be shorten. Moreover, because the absorbent material absorbs microwaves in the temperature zone at least a part of which is lower than the temperature zone in which the metal raw material absorbs microwaves, the heating promoter can be prevented from being heated more than necessary. Accordingly, even while the metal raw material irradiated with microwaves is being sintered or melted, the heating promoter including the absorbent material may remain stable in shape.

The absorbent material includes a carbon material, for example. Examples of carbon material include, but are not limited to, carbon black, amorphous carbon, graphite, silicon carbide, carbon resin, and metal carbide. The absorbent material may include metal raw material, metal nitride, metal oxide, metal boride and the like that absorb microwaves in a temperature zone at least a part of which is lower than the temperature zone in which the metal raw material of the heating target absorbs microwaves. The absorbent material may be a compound thereof. The absorbent material preferably does not contain volatile components. When the absorbent material does not contain volatile components, absorption of microwaves by volatile components can be prevented.

The heating promoter may include a heat insulation material having a higher microwave transmittance than metal raw material and a lower level of microwave absorption than metal raw material. The heat insulation material has a higher melting point than metal raw material. Because the heat insulation material has a low level of microwave absorption, the level of heat generation is low even at a time of microwave irradiation, and the heat insulation material achieves insulation effect. Furthermore, because the heat insulation material has a higher melting point than metal raw material, the shape is stable even at a time of microwave irradiation. Accordingly, even while metal raw material irradiated with microwaves is being sintered or melted, the heating promoter including the heat insulation material may remain stable in shape.

The heat insulation material may include an oxide of metal, or may include an oxide of metalloid. Examples of oxides of metal and metalloid include, but are not limited to, aluminum oxide ($Al_2O_3$), silicon dioxide ($SiO_2$), magnesium oxide (MgO), zirconium oxide ($ZrO_2$), and titanium dioxide ($TiO_2$). For example, the melting point of aluminum oxide ($Al_2O_3$) is 2072° C. The melting point of silicon dioxide ($SiO_2$) is 1710° C. The melting point of magnesium oxide (MgO) is 2852° C. The heat insulation material may be a compound thereof.

The heating promoter may include a reducing material for reducing metal raw material. The reducing material has a higher melting point than the metal raw material. Examples of reducing material include carbon and silicon carbide. The carbon material that is used as the absorbent material may also function as the reducing material.

The heating promoter may be composed only of the heat insulation material, or only of the absorbent material, or only of the reducing material, or may include a mixture of the heat insulation material and the absorbent material, or may include a mixture of the absorbent material and the reducing material, or may include a mixture of the reducing material and the heat insulation material, or may include a mixture of the heat insulation material, the absorbent material and the reducing material. Properties and functions may overlap among the heat insulation material, the absorbent material, and the reducing material. For example, the carbon material may function as the absorbent material, and may also function as the reducing material.

Figure 3:
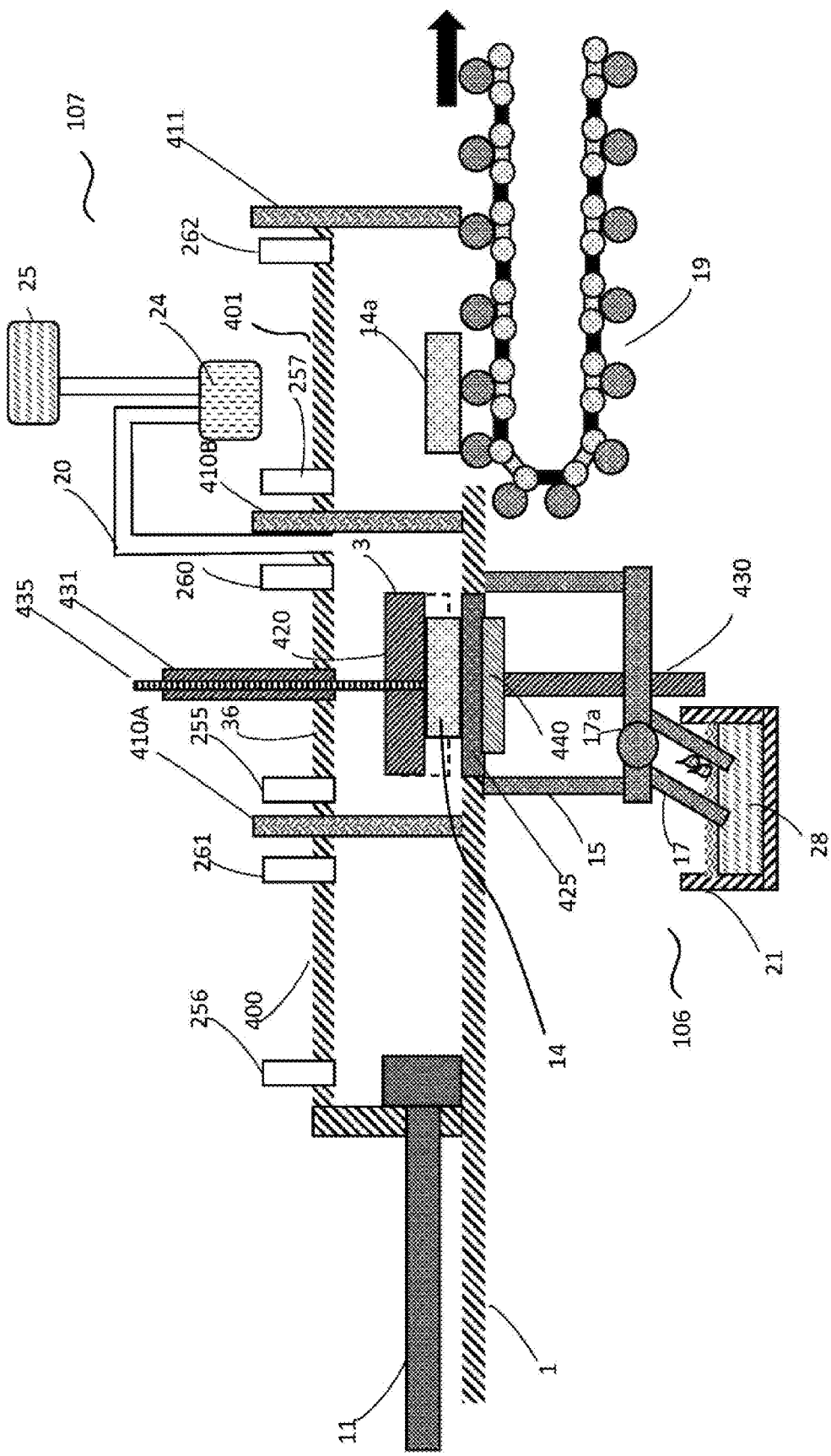
FIG. 3 is a schematic diagram of the heating device according to the embodiment.

As shown in FIG. 3, at the time of irradiation with microwaves on the heating target 14, a contact member 420 including the heating promoter may be brought into contact with the heating target 14. For example, the contact member 420 contacts an upper surface of the heating target 14. The contact member 420 may be movable in the direction of gravity. The contact member 420 may include the heating promoter. By sandwiching the heating target 14 between the holding member 425 including the heating promoter and the contact member 420 including the heating promoter, heating of the heating target 14 can be promoted.

To uniformly heat the heating target 14, the heating target 14 may be rotated relative to the microwave irradiator 3. For example, the heating device according to the embodiment further includes a rotation table 440 for rotating the heating target 14 that is placed on the holding member 425. A shaft 430 is connected to the rotation table 440, and the rotation table 440 is rotatable around the shaft 430. A longitudinal direction of the shaft 430 is parallel to a radiation window of the microwave irradiator 3, and is perpendicular to a major travel direction of microwaves radiated by the microwave irradiator 3, for example.

At the time of rotation of the heating target 14 by the rotation table 440, the contact member 420 that is in contact with the upper surface of the heating target 14 may be rotated. The contact member 420 may passively rotate according to rotation of the heating target 14. A shaft 435 may be connected to the contact member 420. An opening may be provided at a center of the contact member 420, and the shaft 435 may be inserted in the opening. A sleeve 431 for inserting the shaft 435 may be provided in the irradiation chamber 36. Longitudinal directions of the shaft 435 and the sleeve 431 are parallel to the shaft 430, and a center of the shaft 430 and a center of the shaft 435 are on a same line. The contact member 420 is rotatable around the shaft 435.

In the case where the heating target 14 includes metal oxide, the metal oxide is reduced when the heating target 14 is irradiated with microwaves. In the case where the heating target 14 includes metal, a dense sintered body may be easily obtained by heating the heating target 14 to a sintering temperature or more and to near the melting point. Accordingly, the heating target 14 may be heated by microwaves to 1400° C. or more, or to 1500° C. or more. In the case of melting and solidifying the heating target 14, the heating target 14 may be heated to the melting point or more.

When the heating target 14 is heated, a component included in the heating target 14 may be liquefied and vaporized, and liquid and gas may be generated from the heating target 14. When liquid and gas generated from the heating target 14 continue to be present in the irradiation chamber 36, the liquid and the gas may attach to the heating target 14 and an inner wall of the irradiation chamber 36. Moreover, when irradiation with microwaves is ended and temperature inside the irradiation chamber 36 is reduced, the liquid and the gas attached to the heating target 14 and the inner wall of the irradiation chamber 36 may be solidified.

The liquid and the gas generated from the heating target 14 may be impurities. Accordingly, it is not desirable for the liquid and the gas generated from the heating target 14 to get reattached to the heating target 14. Furthermore, it is not desirable for the liquid and the gas generated from the heating target 14 to get attached to a microwave transparent window of the microwave irradiator 3, because this will reduce microwave radiation efficiency. Moreover, in the case where a measurement device such as a thermometer is provided inside the irradiation chamber 36, attachment of the liquid and the gas generated from the heating target 14 to the measurement device may cause measurement accuracy of the measurement device to be reduced, and thus, such attachment is not desirable.

Furthermore, in the case where the heating target 14 before heating includes oil, heating of the oil may generate poisonous gas such as benzene and toluene.

However, the heating device according to the embodiment includes the collector configured to collect fluid generated from the heating target 14 that is irradiated with microwaves, and thus, liquid and gas generated from the heating target 14 can be prevented from being attached to the heating target 14, the inner wall of the irradiation chamber 36, the microwave transparent window, and the measurement device. Furthermore, poisonous gas can be prevented from being spread around the heating device.

The heating device according to the embodiment may further include a pre-heating chamber 400 that is connected to the irradiation chamber 36. The heating target 14 before irradiation with microwaves is disposed in the pre-heating chamber 400. The pre-heating chamber 400 is provided with a carry-in door, not shown, for allowing the heating target 14 to be carried in from outside. A carry-in door 410A is disposed between the pre-heating chamber 400 and the irradiation chamber 36, and the carry-in door 410A is opened at the time of moving the heating target 14 from the pre-heating chamber 400 to the irradiation chamber 36.

The pre-heating chamber 400 may function as a load lock chamber. For example, the heating device may include a gaseous environment conditioner for equalizing a gaseous environment inside the irradiation chamber 36 and a gaseous environment inside the pre-heating chamber 400. For example, the irradiation chamber 36 is provided with a gas introduction pipe 255 and a gas discharge pipe 260, and the pre-heating chamber 400 is provided with a gas introduction pipe 256 and a gas discharge pipe 261.

By discharging gas inside the irradiation chamber 36 from the gas discharge pipe 260 and introducing gas of a desired composition into the irradiation chamber 36 from the gas introduction pipe 255 in a state where the irradiation chamber 36 is sealed, a desired gas condition can be set inside the irradiation chamber 36. Furthermore, by discharging gas inside the pre-heating chamber 400 from the gas discharge pipe 261 and introducing gas of a desired composition into the pre-heating chamber 400 from the gas introduction pipe 256 in a state where the pre-heating chamber 400 is sealed, a desired condition can be set with respect to gas inside the pre-heating chamber 400.

Gas to be introduced into the pre-heating chamber 400 and the irradiation chamber 36 may be an inert gas. Examples of inert gas include argon (Ar) and helium (He). Gas to be introduced into the pre-heating chamber 400 and the irradiation chamber 36 may be a neutral gas. Examples of neutral gas include nitrogen ($N_2$), dry hydrogen ($H_2$), and ammonia ($NH_3$). Gas to be introduced into the pre-heating chamber 400 and the irradiation chamber 36 may be a reducing gas. Examples of reducing gas include hydrogen ($H_2$), carbon monoxide (CO), and hydrocarbon gas ($CH_4$, $C_3H_8$, $C_4H_{10}$, etc.).

After the heating target 14 is placed inside the pre-heating chamber 400, the pre-heating chamber 400 is sealed, and a gas condition inside the pre-heating chamber 400 is made the same as the gas condition inside the irradiation chamber 36. Then, the carry-in door 410A between the pre-heating chamber 400 and the irradiation chamber 36 is opened, the heating target 14 is moved into the irradiation chamber 36, and the carry-in door 410A is closed, and entry of outside air into the irradiation chamber 36 can thus be prevented.

A bottom surface of the pre-heating chamber 400 and a bottom surface of the irradiation chamber 36 may form a continuous stage 1. The heating device according to the embodiment may further include a transporter for moving the heating target 14 from inside the pre-heating chamber 400 to inside the irradiation chamber 36. The transporter may include a pusher 11 configured to push the heating target 14 from inside the pre-heating chamber 400 into the irradiation chamber 36. The pusher 11 includes a rod, for example, and reciprocates between the pre-heating chamber 400 and the irradiation chamber 36.

The heating device according to the embodiment may further include a post-heating chamber 401 that is connected to the irradiation chamber 36. A heating target 14a after irradiation with microwaves is placed in the post-heating chamber 401. The carry-out door 410B is disposed between the irradiation chamber 36 and the post-heating chamber 401, and the carry-out door 410B is opened at the time of moving the heating target 14a from the irradiation chamber 36 to the post-heating chamber 401. The post-heating chamber 401 is provided with a carry-out door 411 for allowing the heating target 14a to be carried out from inside to outside.

The post-heating chamber 401 may function as a load lock chamber. For example, the heating device may include a gaseous environment conditioner for equalizing the gaseous environment inside the irradiation chamber 36 and a gaseous environment inside the post-heating chamber 401. For example, the post-heating chamber 401 is provided with a gas introduction pipe 257 and a gas discharge pipe 262. By discharging gas inside the post-heating chamber 401 from the gas discharge pipe 262 and introducing gas of a desired composition into the post-heating chamber 401 from the gas introduction pipe 257 in a state where the post-heating chamber 401 is sealed, a desired condition can be set with respect to gas inside the post-heating chamber 401.

Before transporting the heating target 14a from the irradiation chamber 36 to the post-heating chamber 401, the post-heating chamber 401 is sealed, and a gas condition inside the post-heating chamber 401 is made the same as the gas condition inside the irradiation chamber 36. Then, the carry-out door 410B between the irradiation chamber 36 and the post-heating chamber 401 is opened, the heating target 14a is moved into the post-heating chamber 401, the carry-out door 410B is closed, and then, the carry-out door 411 of the post-heating chamber 401 is opened and the heating target 14a is carried out from the post-heating chamber 401, and entry of outside air into the irradiation chamber 36 can thus be prevented.

The heating device according to the embodiment may further include a transporter for moving the heating target 14a from inside the post-heating chamber 401 to outside. The transporter may include a caterpillar conveyor 19 configured to carry out the heating target 14a from inside the post-heating chamber 401 to outside.

Figure 4:
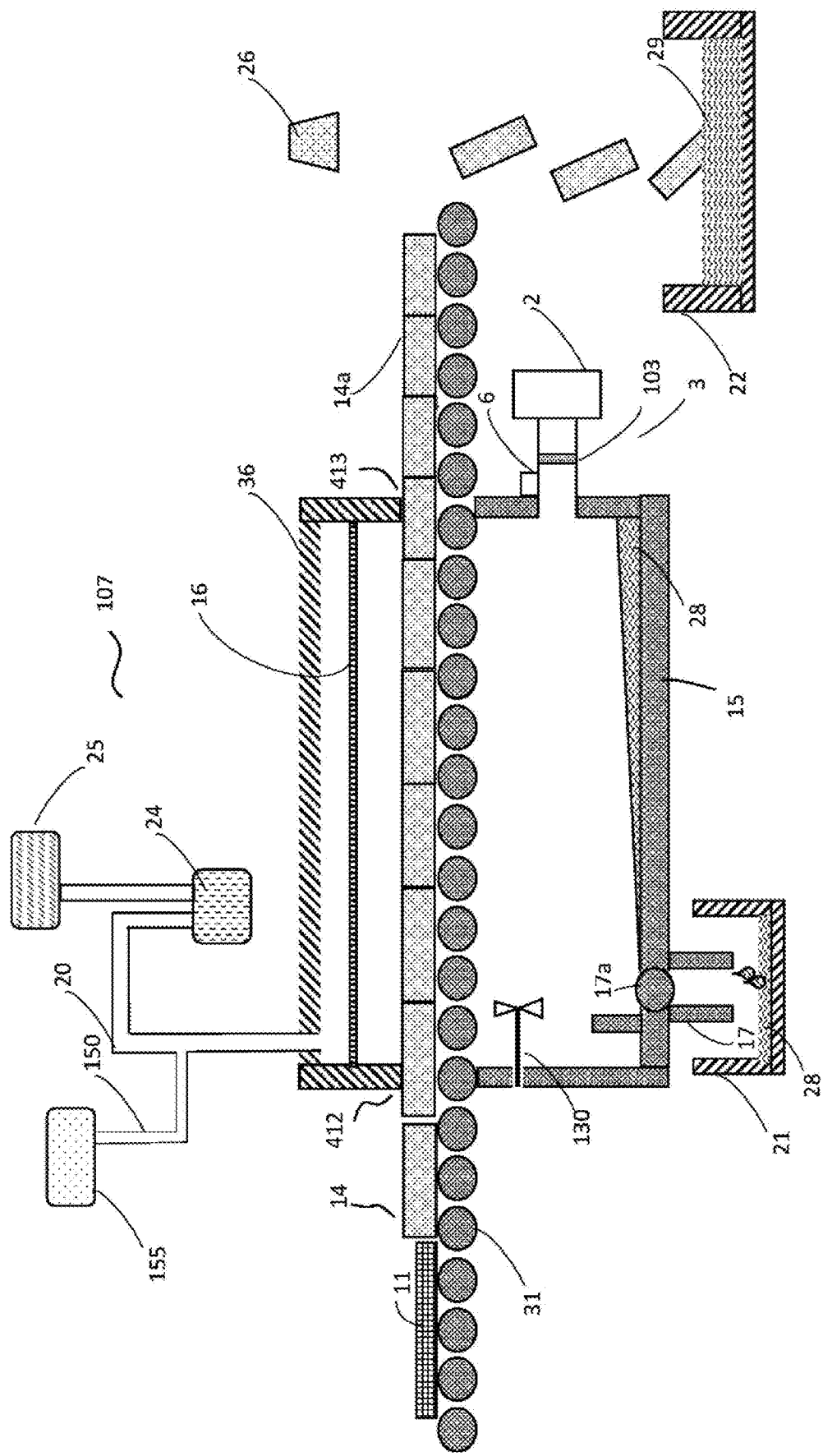
FIG. 4 is a schematic diagram of the heating device according to the embodiment.

With the heating device according to the embodiment shown in FIG. 4, the irradiation chamber 36 is provided with a carry-in port 412 and a carry-out port 413. The heating device shown in FIG. 4 includes a transporter for the heating target 14, the transporter penetrating the irradiation chamber 36 through the carry-in port 412 and the carry-out port 413. For example, the transporter includes a roller conveyor 31 allowing the heating target 14 to flow on an upper surface, and a pusher 11 for pushing the heating target 14 on the roller conveyor 31. A plurality of heating targets 14 may flow on the roller conveyor 31, and the plurality of heating targets 14 may be successively irradiated with microwaves inside the irradiation chamber 36.

The microwave irradiator 3 may be provided at any position in the irradiation chamber 36. In the example shown in FIG. 4, a microwave inlet is provided on a lower side in the direction of gravity than a disposed position of the heating target 14 inside the irradiation chamber 36. For example, the microwave irradiator 3 may include a microwave generation unit 2 for generating microwaves, a microwave transparent window 103 for allowing transmittance of microwaves generated by the microwave generation unit 2, and an air curtain supplier 6 for preventing a volatile matter inside the irradiation chamber 36 from being attached to a surface of the microwave transparent window 103. For example, the microwave transparent window 103 is formed of quartz glass. The air curtain supplier 6 prevents attachment of a volatile matter to the microwave transparent window 103 by supplying an air curtain along the microwave transparent window 103. The same can be applied to heating devices shown in other drawings.

Furthermore, the heating device may include a fan 130 for spreading microwaves inside the irradiation chamber 36. When the fan 130 rotates and a surface of the fan 130 reflects microwaves, the microwaves are agitated, and positions of dead spots where intensity of microwaves is low that is generated due to interference between microwaves inside the irradiation chamber 36 are changed over time. The heating target 14 can thereby be uniformly heated. The fan may be provided inside the irradiation chamber 36 also in the case of heating devices shown in other drawings.

The gas collector 107 may include an analysis device 155 for analyzing components of gas collected from inside the irradiation chamber 36. For example, the analysis device 155 is connected to a pipe 150 that is branched from the gas collection pipe 20. Examples of the analysis device 155 include a gas chromatograph (GC), a gas chromatograph-mass spectrometer (GC/MS), an infrared spectrometer, and a Fourier transform infrared spectrometer. The gas collector may include the analysis device also in the case of heating devices shown in other drawings.

A porous partition 16 may be disposed between a position inside the irradiation chamber 36 where the heating target 14 is disposed and the gas collector 107. As an example of the porous partition 16, a perforated metal can be cited. The porous partition 16 may be disposed between the position inside the irradiation chamber 36 where the heating target 14 is disposed and the liquid collector 106.

In the case where the heating target 14a is metal, the heating target 14a heated by the heating device may be fed into a molten metal 29 in a melting furnace 22. At least a part of metal included in the molten metal is desirably the same as at least a part of metal included in the heating target 14a that is heated. The molten metal 29 may be monitored by a camera 26. For example, a metal casting may be produced by feeding molten metal obtained by melting the heating target 14a into a mold and solidifying the molten metal inside the mold.

For example, the heating target 14a that is heated by the heating device is reduced and does not include an oxidized film, and is thus suitable for being fed into molten metal. Furthermore, the heating target 14a that is heated by the heating device is suitable for being fed into molten metal because non-metal is liquefied or vaporized and removed. More specifically, gas, steam explosion, ignition, slag, and blister are less likely to occur when the heating target 14a after removal of oxide and non-metal is fed into molten metal. Furthermore, the heating target 14a after removal of oxide has a high wettability to molten metal, and is easily submerged in the molten metal. Heat is easily transferred to inside of the heating target 14a that is submerged in molten metal, and thus, melt rate is high.

Also in the case of heating devices shown in drawings other than FIG. 4, the heating target that is heated may be fed into molten metal. Other structural elements of the heating device shown in FIG. 4 are the same as those of the heating device shown in FIGS. 2 and 3, and description thereof will be omitted.

Figure 5:
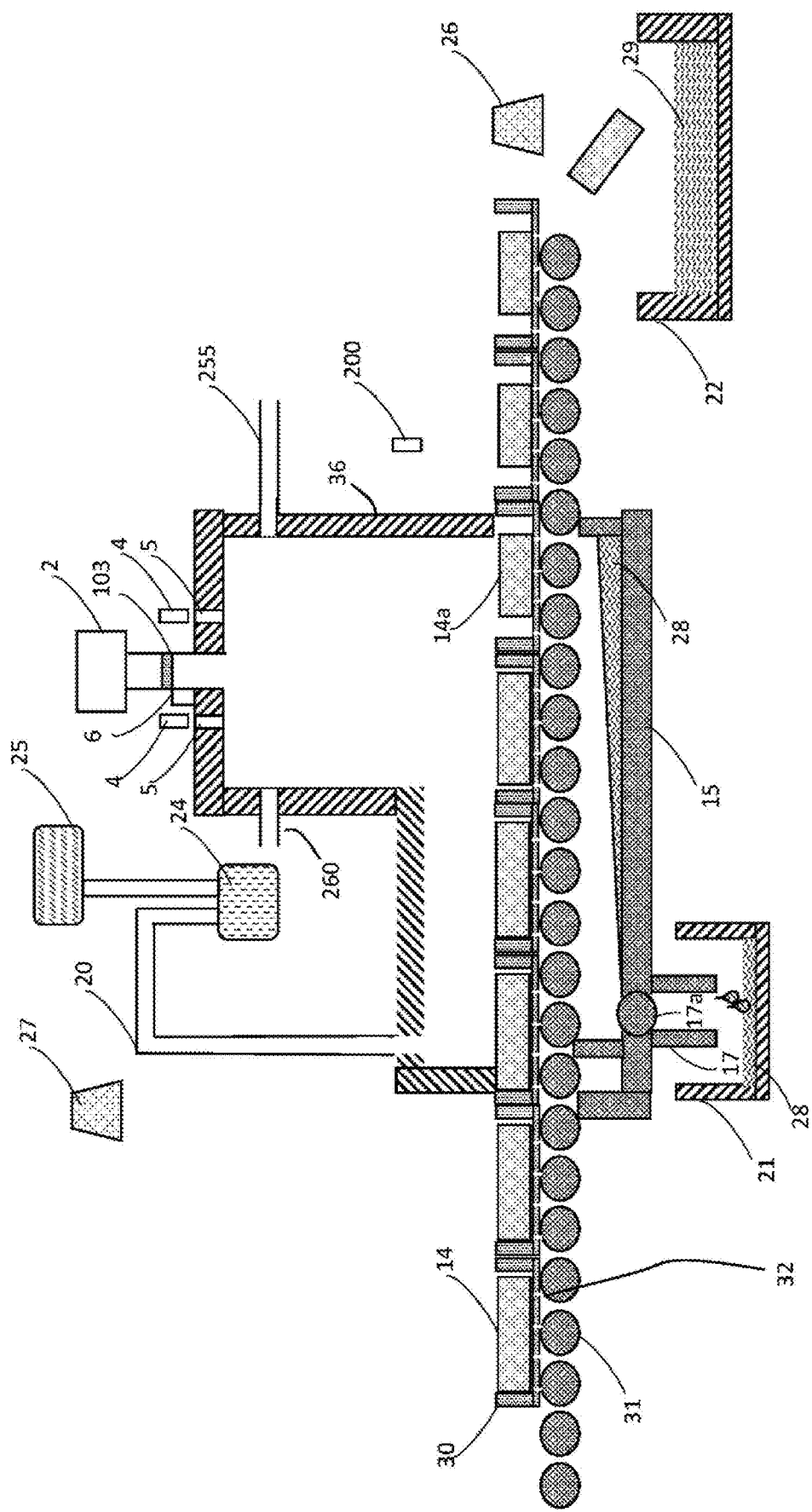
FIG. 5 is a schematic diagram of the heating device according to the embodiment.

A method of transporting the heating target 14 is not particularly limited, and the heating target 14 may be transported directly by the transporter, or, as shown in FIG. 5, the heating target 14 placed on a tray 30 may be transported by the transporter. An opening 32 may be provided in a bottom part of the tray 30 to allow fluid generated from the heating target 14 that is irradiated with microwaves to pass through. One heating target 14 may be placed on one tray 30, or, as shown in FIG. 6, a plurality of heating targets 14 may be placed on one tray 30.

Figure 6:
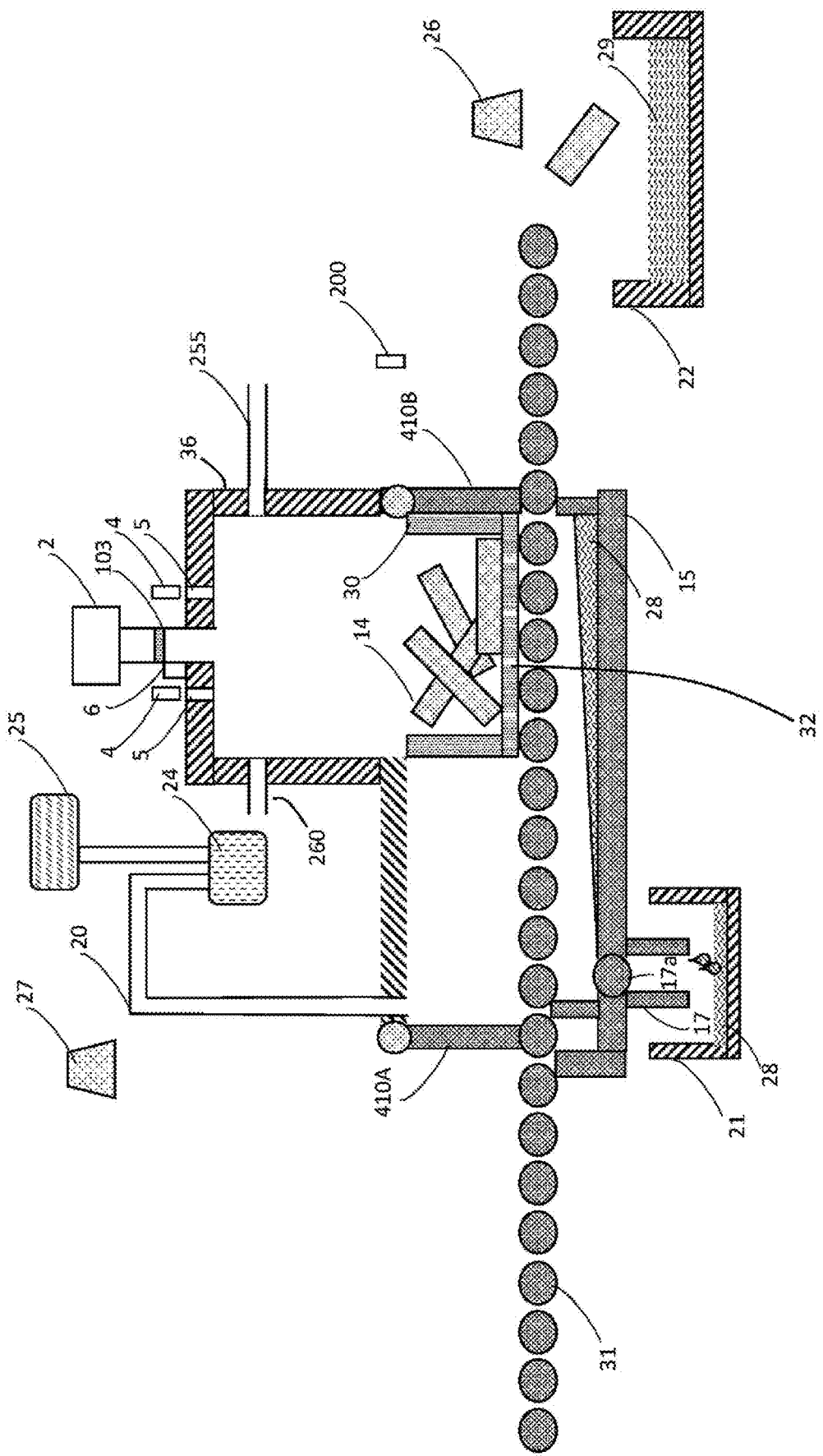
FIG. 6 is a schematic diagram of the heating device according to the embodiment.

As shown in FIGS. 5 and 6, the heating target 14 before transported into the irradiation chamber 36 may be monitored by a camera 27. A window 5 for temperature observation may be provided in the irradiation chamber 36, and temperature inside the irradiation chamber 36 may be measured from outside the irradiation chamber 36 by a non-contact thermometer 4. The non-contact thermometer is a radiation thermometer, for example. A radiation thermometer measures a temperature of a measurement target based on emissivity of the measurement target. For example, the radiation thermometer is a fiber radiation thermometer. A temperature of the heating target that is irradiated with microwaves and carried out from the irradiation chamber 36 may be measured by a non-contact thermometer 200. Other structural elements of the heating device shown in FIGS. 5 and 6 are the same as those of the heating device shown in FIGS. 2 and 3, and description thereof will be omitted.

Figure 7:
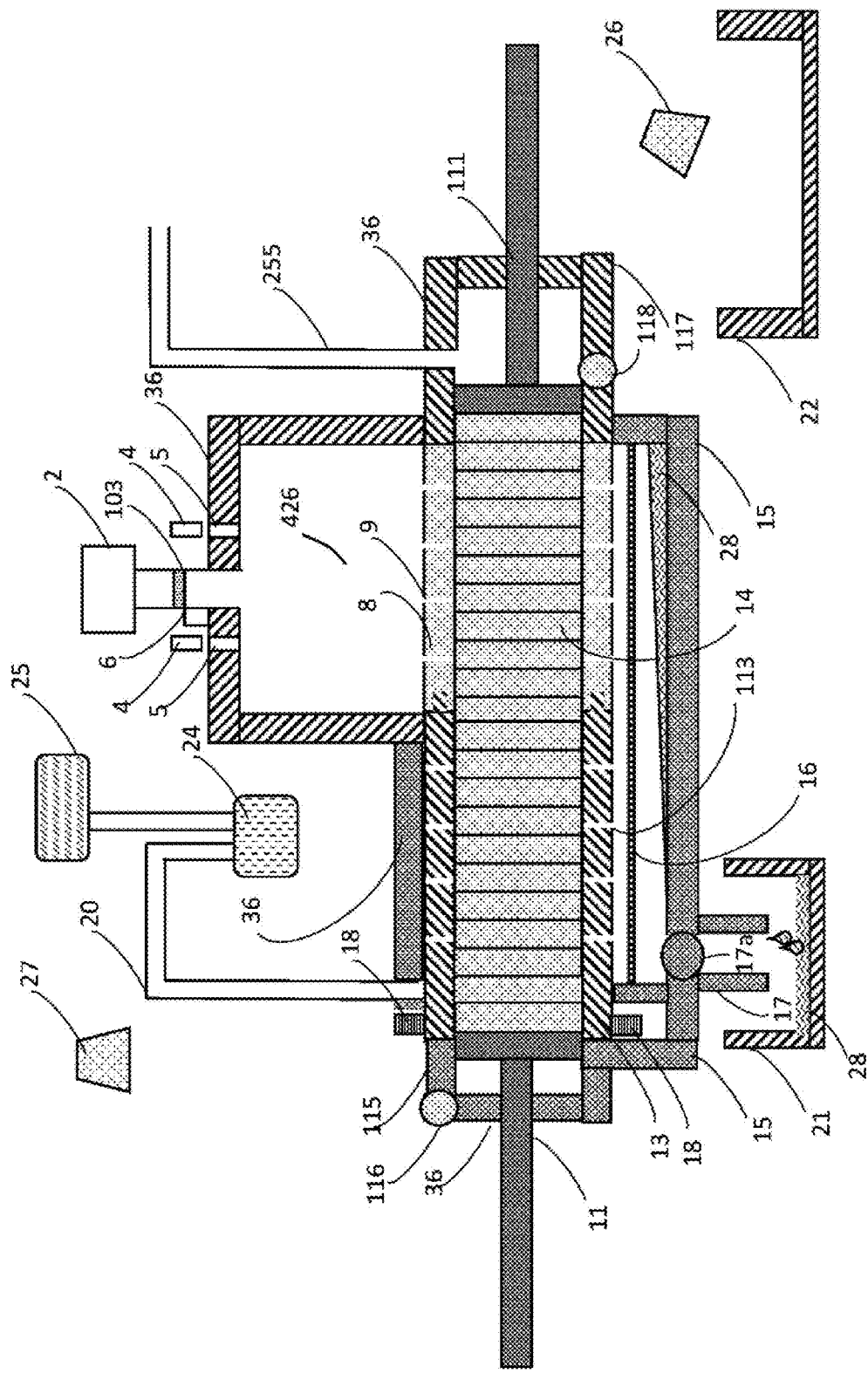
FIG. 7 is a schematic diagram of the heating device according to the embodiment.

As shown in FIG. 7, a holding member 426 for holding the heating target 14 may have a hollow shape. For example, the holding member 426 has a cylindrical shape. The holding member 426 may include a part 8 including a heating promoter, and a part 13 not including a heating promoter. For example, the part 8 of the holding member 426 including the heating promoter is disposed at a position that is irradiated with microwaves, and the part 13 of the holding member 426 not including the heating promoter is disposed at a position that is not irradiated with microwaves. The heating target 14 is disposed inside the holding member 426. At least a part of the heating target 14 may be in contact with the part 8 of the holding member 426 including the heating promoter.

An opening 9 for allowing fluid generated from the heating target 14 to pass through to outside of the holding member 426 may be provided in the part 8 of the holding member 426 including the heating promoter. An opening 113 for allowing fluid generated from the heating target 14 to pass through to outside of the holding member 426 may be provided in the part 13 of the holding member 426 not including the heating promoter.

The holding member 426 having a hollow shape may be disposed inside the irradiation chamber 36 with a center axis perpendicular to the direction of gravity. The heating device may include a rotating device 18 for rotating the holding member 426 around the center axis of the holding member 426. The heating target 14 inside the holding member 426 may, but does not have to, be rotated by a frictional force according to rotation of the holding member 426. When the holding member 426 is irradiated with microwaves while the holding member 426 is being rotated, the holding member 426 is uniformly heated, and the heating target 14 inside the holding member 426 is also uniformly heated.

The heating target 14 is not particularly limited in terms of shape, but in the case where the holding member 426 has a cylindrical shape, the heating target 14 may have a disk-shape. For example, the heating target 14 may be disposed inside the holding member 426 with at least a part of an outer peripheral part of the disk-shaped heating target 14 in contact with an inner peripheral part of the holding member 426.

The heating target 14 inside the holding member 426 having the hollow shape may be moved toward an opening on a carry-out side of the holding member 426 by being pushed by the pusher 11 from an opening on a carry-in side. The heating target 14 inside the holding member 426 may be supported by a supporter 111 from the opening on the carry-out side of the holding member 426 so that the heating target 14 does not fall over. The pusher 11 and the supporter 111 move at a same speed while sandwiching the heating target 14. A shaft of the pusher 11 and a shaft of the supporter 111 may penetrate openings provided in the irradiation chamber 36.

The irradiation chamber 36 may be provided with a carry-in hatch 115, and the heating target 14 may be carried into the irradiation chamber 36 from the carry-in hatch 115. The heating device may include a driver 116 for opening/closing the carry-in hatch 115. The heating target 14 that is carried into the irradiation chamber 36 is moved into the holding member 426 having the hollow shape by being pushed by the pusher 11.

The irradiation chamber 36 may be provided with a carry-out hatch 117, and the heating target 14 may be carried out of the irradiation chamber 36 from the carry-out hatch 117. The heating device may include a driver 118 for opening/closing the carry-out hatch 117. For example, the carry-out hatch 117 may be provided in a bottom part of the irradiation chamber 36. The heating target 14 that is irradiated with microwaves is moved from inside the holding member 426 to above the carry-out hatch 117 by being pushed by the pusher 11, and falls below the irradiation chamber 36 when the carry-out hatch 117 is opened. Other structural elements of the heating device shown in FIG. 7 are the same as those of the heating device shown in FIGS. 2 and 3, and description thereof will be omitted.

Figure 8:
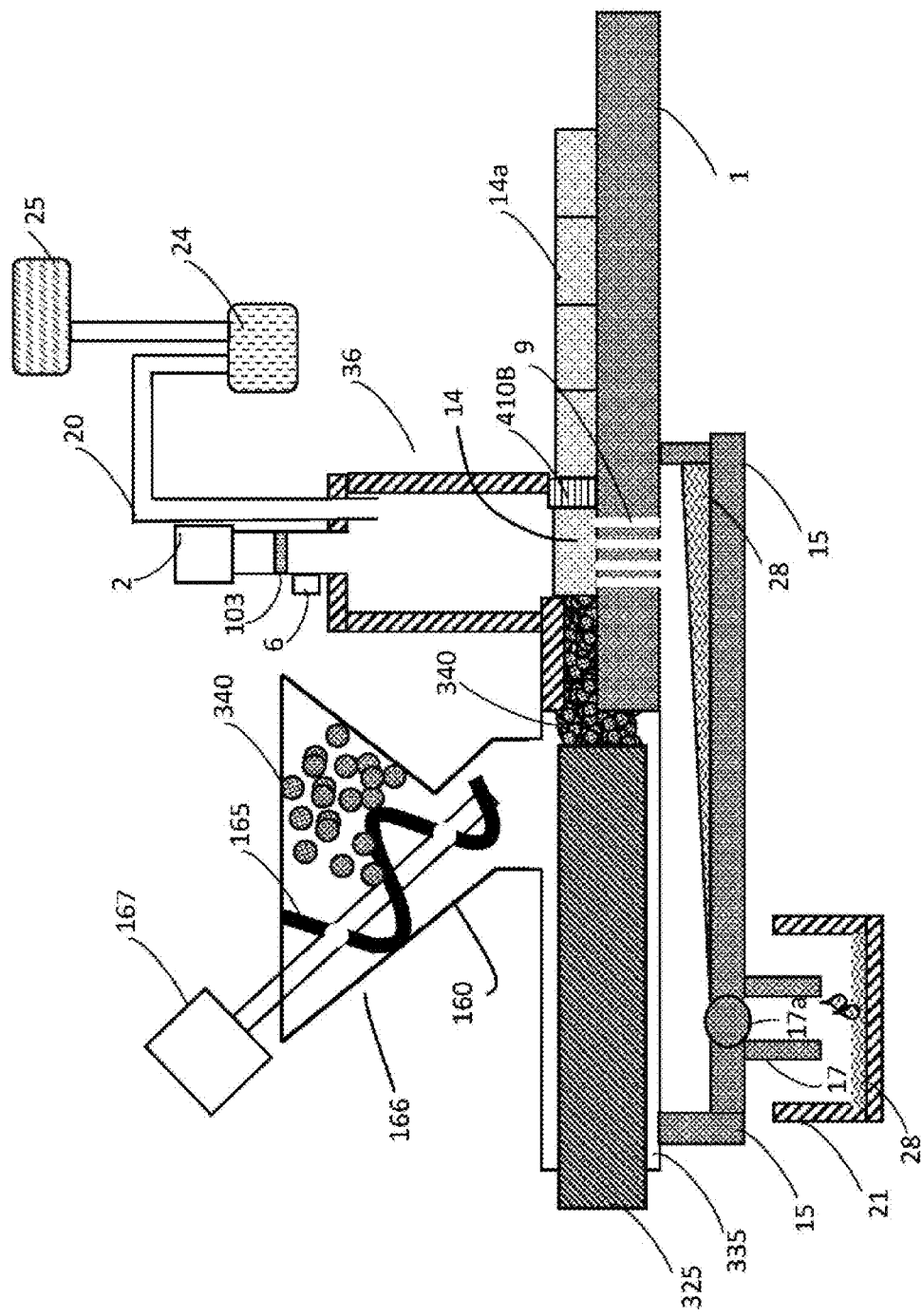
FIG. 8 is a schematic diagram of the heating device according to the embodiment.

As shown in FIG. 8, the heating device may include a supplier 166. The supplier 166 may be a feeder. Raw materials 340 of the heating target 14 supplied from the supplier 166 may be carried into the irradiation chamber 36 by a pusher 325, and the raw materials 340 as the heating target 14 may be irradiated with microwaves. The pusher 325 may be held by a guide 335. The opening 9 for allowing fluid generated from the heating target 14 to pass through may be provided in the stage 1 inside the irradiation chamber 36.

Figure 9:
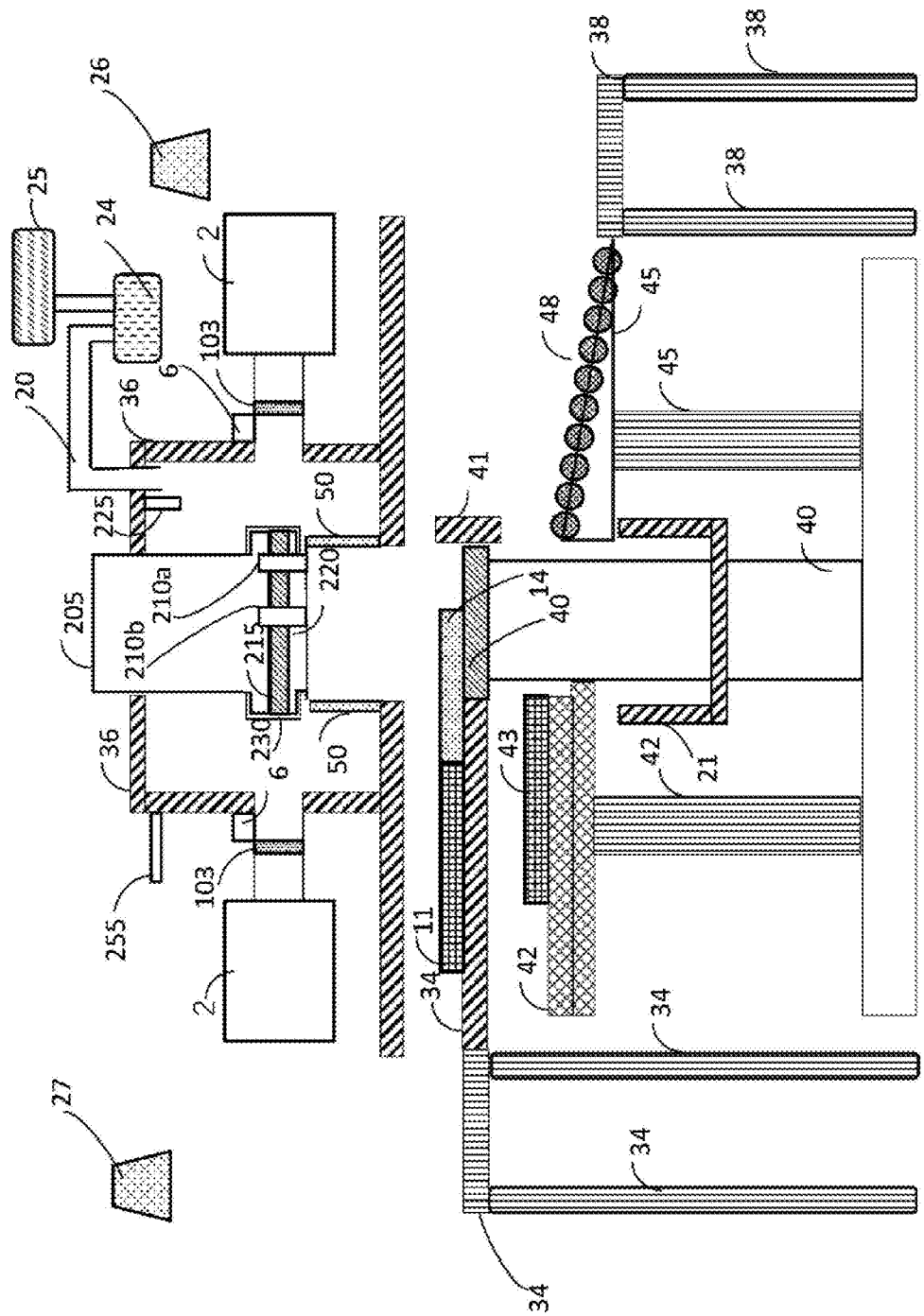
FIG. 9 is a schematic diagram of the heating device according to the embodiment.
Figure 10:
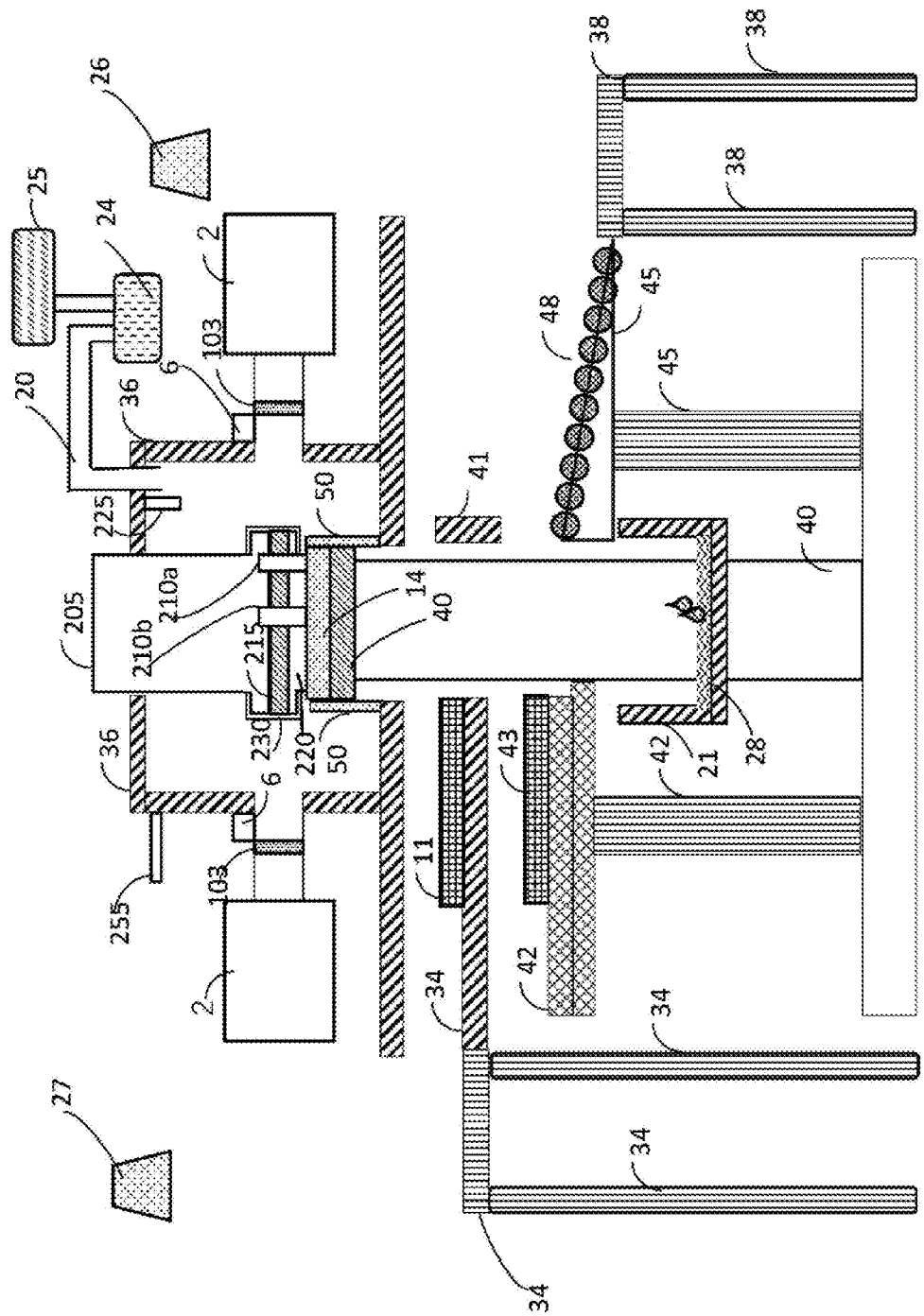
FIG. 10 is a schematic diagram of the heating device according to the embodiment.
Figure 11:
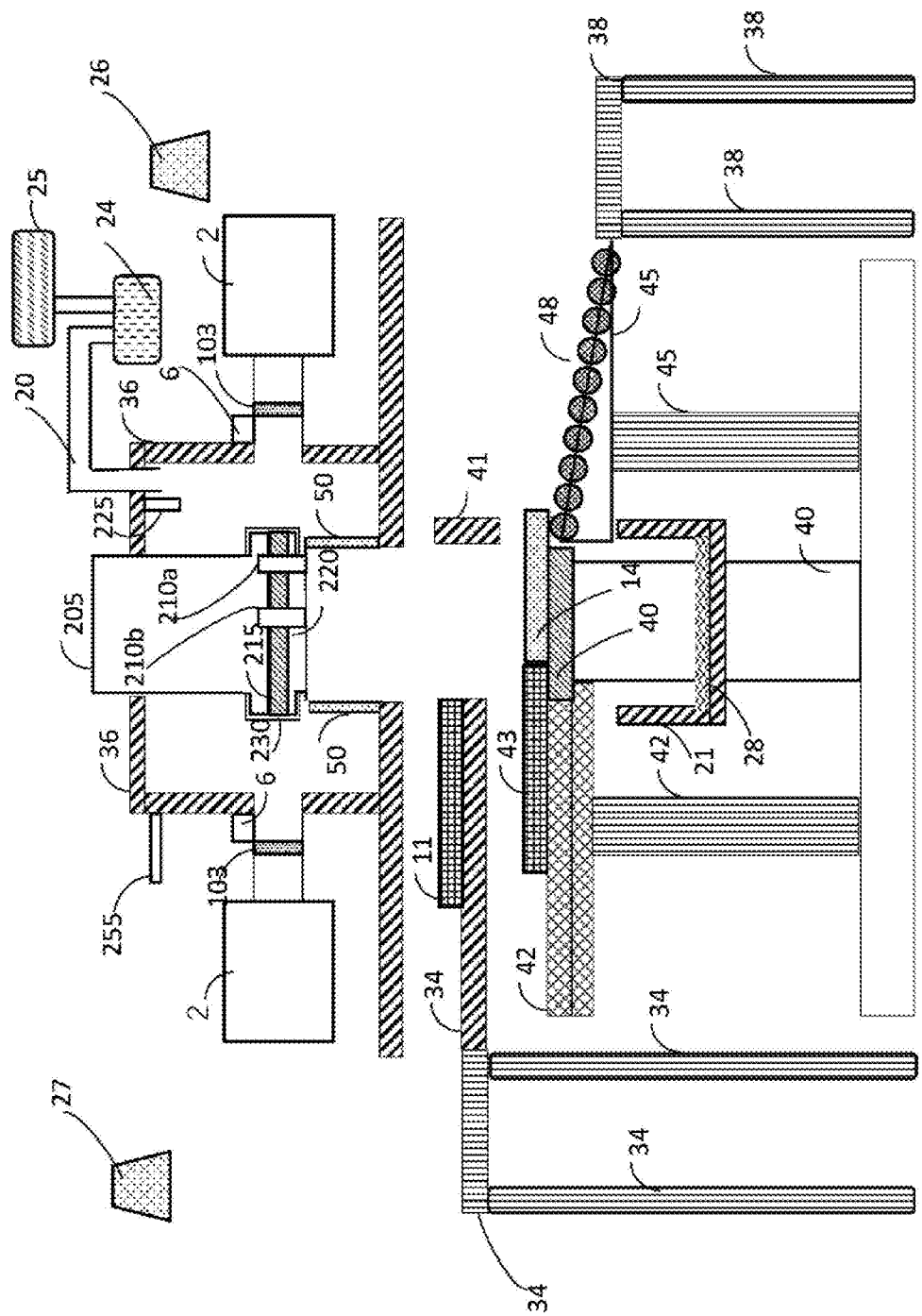
FIG. 11 is a schematic diagram of the heating device according to the embodiment.

As shown in FIGS. 9 to 11, the heating target 14 may be carried in and out from a lower side of the irradiation chamber 36 in the direction of gravity. As shown in FIG. 9, the heating device includes a carry-in stage 34 below the irradiation chamber 36. The pusher 11 moves the heating target 14 on the carry-in stage 34 onto a movable stage 40. The heating device may include a stopper 41 for preventing the heating target 14 from falling off the movable stage 40.

The movable stage 40 is movable in a vertical direction. An opening for allowing fluid generated from the heating target 14 to pass through may be provided in the movable stage 40. As shown in FIG. 10, when the heating target 14 is placed, the movable stage 40 is raised, and the heating target 14 is carried into the irradiation chamber 36 through the opening in the bottom part of the irradiation chamber 36. The heating device may include an enclosure 50 that surrounds a periphery of the heating target 14 that is disposed inside the irradiation chamber 36. For example, the enclosure 50 includes a heating promoter. A reflection plate 225 for reflecting microwaves may be provided inside the irradiation chamber 36.

The heating device may include a press 205 for applying pressure to the heating target 14 on the movable stage 40. An insulation layer 215 and a heating promoting member 220 may be provided on a pressing surface of the press 205. The heating promoting member 220 includes a heating promoter. For example, the insulation layer 215 is disposed between the pressing surface of the press 205 and the heating promoting member 220. The heating promoting member 220 contacts the heating target 14 at the time when the press 205 applies pressure to the heating target 14. The insulation layer 215 prevents transfer, to the press 205, of heat from the heating promoting member 220 and the heating target 14 heated by microwaves. The insulation layer 215 and the heating promoting member 220 may be fixed to the press 205 by a jig 230.

The heating device may irradiate the heating target 14 with microwaves while applying pressure to the heating target 14 by the press 205. For example, the pressure that is applied to the heating target 14 is, but not limited to, 1 MPa or more, 100 MPa or more, or 200 MPa or more, and 2000 MPa or less, 1900 MPa or less, or 1800 MPa or less. When the heating target 14 is irradiated with microwaves while pressure being applied to the heating target 14, the heating target 14 after heating tends to be dense. Moreover, the press 205 may apply pressure to the heating target 14 also after irradiation with microwaves on the heating target 14 is ended.

The temperature of the heating target 14 that is heated may be measured by thermometers 210a, 210b of the press 205. As shown in FIG. 11, after the heating target 14 is irradiated with microwaves, the movable stage 40 is lowered, and the heating target 14 is carried out of the irradiation chamber 36. A pusher 43 pushes the heating target 14 on the lowered movable stage 40 onto a roller conveyor 48. The pusher 43 may be disposed on a base 42, and the roller conveyor 48 may be disposed on a base 45. The heating target 14 after heating may be conveyed onto another conveyor 38 via the roller conveyor 48, for example.

As shown in FIG. 12, the irradiation chamber 36 may be portable. The microwave irradiator 3 may irradiate the heating target 14 inside the irradiation chamber 36 that is being moved by the roller conveyor 31 with microwaves, and fluid generated from the heating target 14 may be discharged to outside the irradiation chamber 36 through the opening provided in the bottom part of the irradiation chamber 36. A heating promoting member 140 including a heating promoter may be fixed to a launcher of the microwave irradiator 3, and the heating target 14 may be irradiated with microwaves after the microwaves pass through the heating promoting member 140. An electromagnetic shield 145 may be disposed in a gap at an openable part of the irradiation chamber 36.

As described above, the present invention has been described according to various embodiments, but the descriptions and drawings forming a part of the disclosure should not be understood to limit the present invention. Various alternate embodiments, examples and operational techniques should be obvious to those skilled in the art based on the disclosure. For example, structural elements of heating devices shown in different drawings may be combined. The present invention should be understood to include various embodiments not described herein.

REFERENCE LIST 1 stage
2 microwave generation unit
3 microwave irradiator
4 non-contact thermometer
5 window
6 air curtain supplier
8 part including heating promoter
9 opening
11 pusher
13 part not including heating promoter
14 heating target
15 drain pan
17 drain pipe
17a valve
18 rotating device
19 caterpillar conveyor
20 gas collection pipe
21 tank
22 melting furnace
24 suction pump
25 liquefier
26 camera
27 camera
28 liquid
29 molten metal
30 tray
31 roller conveyor
32 opening
34 carry-in stage
36 irradiation chamber
38 transporter
40 movable stage
41 stopper
42 base
43 pusher
45 base
48 roller conveyor
103 microwave transparent window
105 collector
106 liquid collector
107 gas collector
111 supporter
113 opening
115 carry-in hatch
116 driver 117 carry-out hatch
118 driver
130 fan
140 heating promoting member
145 electromagnetic shield
150 pipe
155 analysis device
160 hopper
165 screw
166 supplier
167 driver
200 non-contact thermometer
205 press
210a thermometer
215 insulation layer
220 heating promoting member
225 reflection plate
230 jig
255 gas introduction pipe
256 gas introduction pipe
257 gas introduction pipe
260 gas discharge pipe
261 gas discharge pipe
262 gas discharge pipe
325 pusher
335 guide
340 raw material
400 pre-heating chamber
401 post-heating chamber
410A carry-in door
410B carry-out door
411 carry-out door
412 carry-in port
413 carry-out port
420 contact member
425 holding member
426 holding member
430 shaft
431 sleeve
435 shaft
440 rotation table

The invention claimed is:

1. A heating device comprising:
a microwave irradiator configured to irradiate a heating target with microwaves;
an irradiation chamber where the heating target to be irradiated with the microwaves is disposed; and
a collector configured to collect fluid generated from the heating target that is irradiated with the microwaves, wherein the fluid includes liquid and gas,
wherein the collector includes a liquid collector configured to collect the liquid from the irradiation chamber and a gas collector configured to collect the gas from the irradiation chamber,
wherein the liquid collector is disposed on a lower side than the heating target in a direction of gravity,
wherein the gas collector includes a gas collection pipe that is connected to the irradiation chamber, and
wherein the gas collector includes a liquefier configured to liquefy the gas that is collected.

2. The heating device according to claim 1, wherein the liquid collector includes a drain pan configured to receive the liquid.

3. The heating device according to claim 2, wherein the liquid collector further includes a drain pipe that is connected to the drain pan and through which the liquid flows.

4. The heating device according to claim 3, wherein the liquid collector further includes a tank that is connected to the drain pipe and that stores the liquid.

5. The heating device according to claim 1, further comprising a holding member configured to hold the heating target, the holding member being disposed in the irradiation chamber, the holding member including an opening for allowing the liquid to pass through to the liquid collector.

6. The heating device according to claim 5, wherein the holding member is rotatable.

7. The heating device according to claim 5, wherein the holding member has a hollow shape, and the heating target is disposed inside the holding member.

8. The heating device according to claim 1, further comprising:
a pre-heating chamber connected to the irradiation chamber; and
a gaseous environment conditioner configured to equalize a gaseous environment inside the irradiation chamber and a gaseous environment inside the pre-heating chamber,
wherein the heating target before irradiation with the microwaves is disposed in the pre-heating chamber.

9. The heating device according to claim 1, further comprising:
a post-heating chamber connected to the irradiation chamber; and
a gaseous environment conditioner configured to equalize a gaseous environment inside the irradiation chamber and a gaseous environment inside the post-heating chamber,
wherein the heating target after irradiation with the microwaves is disposed in the post-heating chamber.

10. The heating device according to claim 1, wherein the fluid is at least one of oil and water.

* * * * *